(12) United States Patent
Damick

(10) Patent No.: US 12,175,002 B2
(45) Date of Patent: *Dec. 24, 2024

(54) CLOUD-BASED SYSTEM FOR PROTECTING SENSITIVE INFORMATION IN SHARED CONTENT

(71) Applicant: Capital One Services, LLC, McLean, VA (US)

(72) Inventor: Jeffrey Damick, South Riding, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,681

(22) Filed: Oct. 5, 2023

(65) Prior Publication Data

US 2024/0037277 A1 Feb. 1, 2024

Related U.S. Application Data

(63) Continuation of application No. 17/468,881, filed on Sep. 8, 2021, now Pat. No. 11,790,118, which is a continuation of application No. 16/535,312, filed on Aug. 8, 2019, now Pat. No. 11,120,164, which is a continuation of application No. 16/028,373, filed on Jul. 5, 2018, now Pat. No. 10,410,016.

(51) Int. Cl.
| | | |
|---|---|---|
| G06F 21/62 | (2013.01) | |
| G06F 40/169 | (2020.01) | |
| H04L 9/40 | (2022.01) | |

(52) U.S. Cl.
CPC ........ *G06F 21/6254* (2013.01); *G06F 40/169* (2020.01); *H04L 63/0435* (2013.01); *H04L 63/0442* (2013.01); *H04L 63/083* (2013.01); *H04L 63/10* (2013.01); *H04L 63/12* (2013.01)

(58) Field of Classification Search
None
See application file for complete search history.

(56) References Cited

U.S. PATENT DOCUMENTS

| | | | | |
|---|---|---|---|---|
| 10,410,016 | B1* | 9/2019 | Damick | H04L 63/0435 |
| 2002/0001395 | A1* | 1/2002 | Davis | G06F 21/10 |
| | | | | 705/317 |
| 2007/0030528 | A1* | 2/2007 | Quaeler | G06F 16/33 |
| | | | | 358/448 |

(Continued)

*Primary Examiner* — William J. Goodchild
(74) *Attorney, Agent, or Firm* — Foley & Lardner LLP

(57) ABSTRACT

Cloud-based methods and systems for content sharing are disclosed. In some embodiments, the systems may include one or more processors configured to: receive, from a client device, an instruction for sharing a designated digital asset; retrieve the designated digital asset from a storage device; determine provenance of the designated digital asset based on metadata of the designated digital asset; generate authentication information based on the provenance of the designated digital asset; identify sensitive information in the designated digital asset; generate a redacted version of the designated digital asset by modifying content of the designated digital asset to alter the identified sensitive information; and provide the redacted version and authentication information of the designated digital asset to a recipient of the designated digital asset.

19 Claims, 7 Drawing Sheets

(56) References Cited

U.S. PATENT DOCUMENTS

| | | | |
|---|---|---|---|
| 2009/0077168 A1* | 3/2009 | Sadasue | G06F 16/51 |
| | | | 709/203 |
| 2010/0205221 A1* | 8/2010 | Shaw | G06F 16/958 |
| | | | 707/E17.019 |
| 2011/0161668 A1* | 6/2011 | Sentinelli | H04L 63/12 |
| | | | 713/168 |
| 2014/0075335 A1* | 3/2014 | Hicks | G06Q 10/10 |
| | | | 715/753 |
| 2014/0281847 A1* | 9/2014 | Marra | G06T 11/60 |
| | | | 715/202 |
| 2016/0019415 A1* | 1/2016 | Ra | G06T 7/73 |
| | | | 382/197 |
| 2016/0132719 A1* | 5/2016 | Fithian | G06F 18/214 |
| | | | 345/647 |
| 2016/0358013 A1* | 12/2016 | Carter | G06F 21/32 |
| 2017/0099344 A1* | 4/2017 | Hadfield | H04L 63/20 |
| 2017/0206523 A1* | 7/2017 | Goeringer | G06Q 20/409 |

* cited by examiner

CLOUD-BASED SYSTEM FOR PROTECTING SENSITIVE INFORMATION IN SHARED CONTENT

CROSS-REFERENCE TO RELATED APPLICATIONS

This application is a continuation of U.S. patent application Ser. No. 17/468,881, filed Sep. 8, 2021, which is a continuation of U.S. patent application Ser. No. 16/535,312, filed Aug. 8, 2019, which is a continuation of U.S. patent application Ser. No. 16/028,373, filed Jul. 5, 2018, and entitled "CLOUD-BASED SYSTEM FOR PROTECTING SENSITIVE INFORMATION IN SHARED CONTENT." The disclosure of the above-referenced applications is expressly incorporated herein by reference in its entirety.

TECHNICAL FIELD

The present disclosure generally relates to cloud-based systems and methods for content sharing, and more particularly, to a cloud-based content-sharing system which identifies and removes sensitive information from a digital asset to be shared with other users.

BACKGROUND

Cloud-based secure storage provides a convenient way for users to store their valuable digital assets, such as bank statements, salary stubs, shopping receipts, credit reports, medical reports, school transcripts, photos, video clips, etc. A digital asset may be any digital data capable of being stored in cloud storage. Popular cloud storage services also allow users to freely share their stored digital assets with others. For example, a car dealer may upload a receipt to a user's cloud storage account, saving the user the trouble of keeping a physical copy of the receipt. As another example, an accountant may upload a tax return form to the user's cloud storage account for the user's review and signature or a copy of a filed tax return for the user's records. A user may also share her own digital assets with other people or entities. For example, the user may want to post some photos stored in her cloud storage account to a social media website. As another example, the user may need to share her salary stubs stored in the cloud storage account with a landlord in order to complete a rental application.

The digital assets stored in a user's cloud storage account may contain sensitive information that the user does not want to disclose to other people. Thus, prior to sharing or distributing a stored digital assert, the user may wish to alter, e.g., redact, remove, or obscure, sensitive information contained in a digital asset. For example, the user may want to conceal her social security number, personal phone number, etc. As another example, the user may not want to share photos of her children.

Typically, the user manually reviews the digital asset to be shared and alters portions of text or images in the digital asset before sharing it to maintain confidentiality of the sensitive information. However, this process is often time consuming and tedious. Moreover, redacting a digital asset such as a photo may require certain level of computer skills that an ordinary user may lack. These issues either keep users from sharing their cloud-stored digital assets, or force users to compromise the confidentiality of their data. Therefore, it is desirable to provide improved cloud-based content-sharing technology to streamline the process of removing, redacting, or otherwise obscuring sensitive information in a digital assert before the asset is shared, and to provide convenient tools for users to protect their sensitive information.

SUMMARY

The disclosed embodiments include cloud-based content-sharing systems and methods.

In one embodiment, a system for sharing data is disclosed. The system includes a memory storing instructions and one or more processors in communication with a storage device. The one or more processors are configured to execute the stored instructions to: receive, from a client device, an instruction for sharing a designated digital asset; retrieve the designated digital asset from the storage device; determine provenance of the designated digital asset based on metadata of the designated digital asset; generate authentication information based on the provenance of the designated digital asset; identify sensitive information in the designated digital asset; generate a redacted version of the designated digital asset by modifying content of the designated digital asset to alter the identified sensitive information; and provide the redacted version and authentication information of the designated digital asset to a recipient of the designated digital asset.

In another embodiment, a computer-implemented content-sharing method is disclosed. The method may include receiving, from a client device, an instruction for sharing a designated digital asset. The method may also include retrieving the designated digital asset from a storage device. The method may also include determining provenance of the designated digital asset based on metadata of the designated digital asset. The method may also include generating authentication information based on the provenance of the designated digital asset. The method may also include identifying sensitive information in the designated digital asset. The method may also include generating a redacted version of the designated digital asset by modifying content of the designated digital asset to alter the identified sensitive information. The method may further include providing the redacted version and authentication information of the designated digital asset to a recipient of the designated digital asset.

Aspects of the disclosed embodiments may include non-transitory, tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate exemplary disclosed embodiments and, together with the description, serve to explain the disclosed embodiments. In the drawings.

DETAILED DESCRIPTION

Reference will now be made to exemplary embodiments, examples of which are illustrated in the accompanying drawings and disclosed herein. Wherever convenient, the same reference numbers will be used throughout the drawings to refer to the same or like parts.

The disclosed embodiments are directed to cloud-based systems and methods for sharing digital assets. In particular, the disclosed systems provide online storage environments for storing digital assets owned by users. In response to the user's request to share a digital asset, a system may automatically identify sensitive information in the digital asset and generate a redacted version of the digital asset by removing, redacting, or otherwise obscuring the identified sensitive information. The system may automatically identify sensitive information in the digital asset allow the user to select what action to take (e.g., allowing the user to remove, redact, or otherwise obscure some or all of the identified information or to send the digital asset without alterations). The system may also determine provenance of the digital asset based on metadata of the digital asset and generate authentication or verification information for the digital asset. The system may further provide the redacted version and the authentication/verification information of the digital asset to a recipient. This way, the asset sender's sensitive information can be kept confidential, while the authenticity of the redacted version is evident to the recipient.

As used in the present disclosure, "sensitive information" refers to information which an owner of a digital asset does not want to share with other people. For example, a non-exhaustive list of sensitive information may include personally-identifiable information, such as an address, a photo of the user's residence or family members, a social security number, a financial account number, a patient ID or even appointment dates shown on a medical record, an email address, and/or a phone number. As another example, the sensitive information may include trade secret or classified information of an organization or company. As yet another example, the sensitive information may include privileged information, such as communication between an attorney and her client.

As used in the present disclosure, "owner" refers to a person or entity whose sensitive information is contained in the digital asset. Often, the owner of the sensitive information also owns the digital asset, but digital assets may be owned by other users or entities.

Figure 1:
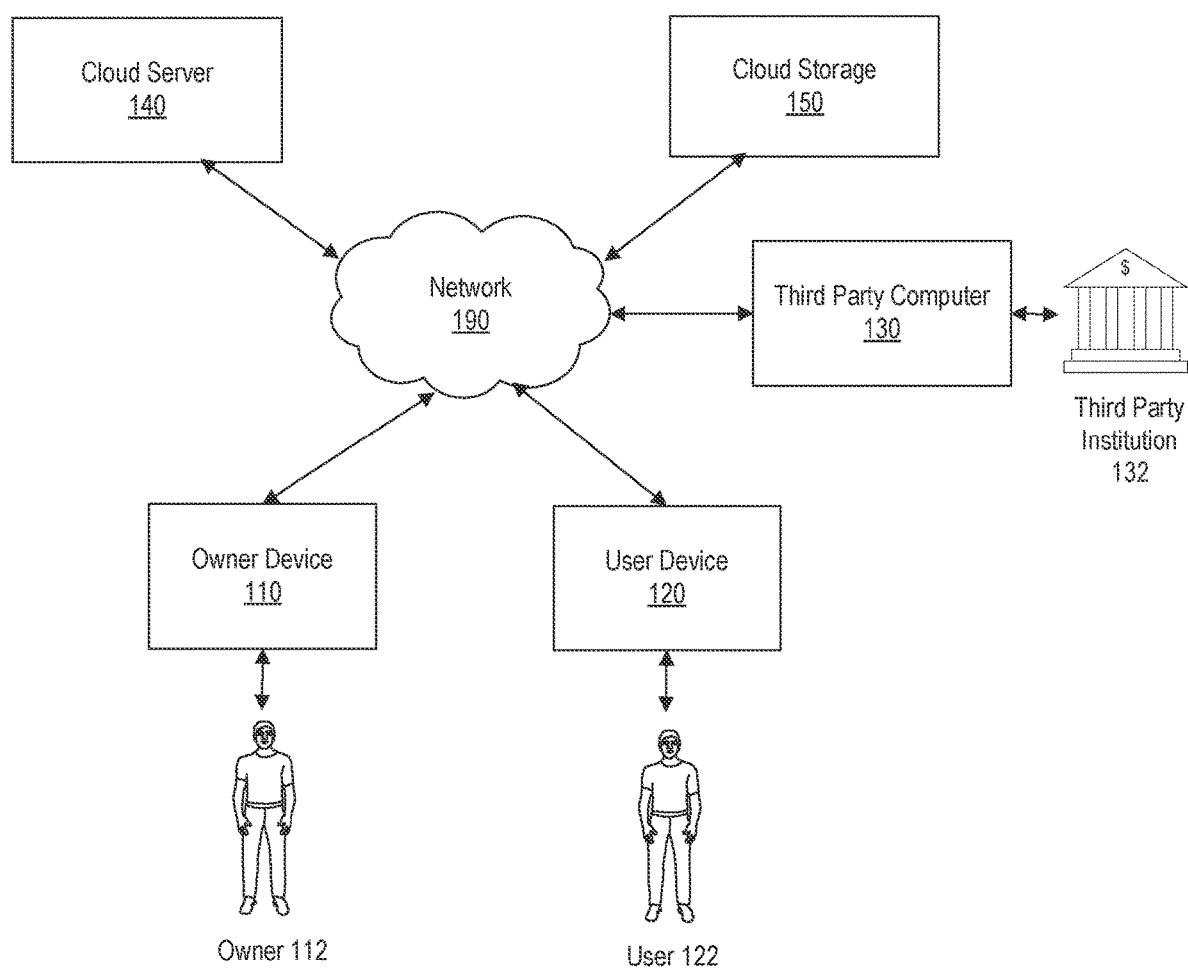
FIG. 1 is a schematic diagram illustrating an exemplary cloud-based system for content sharing, consistent with disclosed embodiments.

FIG. 1 is a schematic diagram illustrating an exemplary cloud-based system 100 for content sharing, consistent with disclosed embodiments. Referring to FIG. 1, system 100 may include owner device 110 associated with owner 112, user device 120 associated with user 122, a third party computer 130 associated with third party institution 132, a cloud server 140, and a cloud storage 150. The components of system 100 may communicate with each other via a network 190.

Network 190 may comprise any type of computer networking arrangement used to exchange data. For example, network 190 may be the Internet, a private data network, virtual private network using a public network, and/or other suitable connection(s) that enables system 100 to send and receive information between the components of system 100. Network 190 may also include a public switched telephone network ("PSTN") and/or a wireless network.

Cloud server 140 may be operated by a provider of cloud computing services. Cloud server 140 is configured to manage a cloud storage service. For example, cloud server 140 may be configured to receive an uploaded digital asset, e.g., owner 112, user 122, third party institution 132, authenticate the digital asset, and save the digital asset in an online storage device, such as cloud storage 150. The digital asset may be uploaded by the owner 112 of the digital asset (e.g., via owner device 110 or any device connected to network 190), another individual (e.g., via user device 120 or any device connected to network 190), or a third party institution 132 (e.g., via third party computer 130 or any device connected to network 190). Later, when receiving a request from to share the digital asset, cloud server 140 may retrieve the digital asset from the online storage device, redact, remove, or otherwise obscure sensitive information from the digital asset, generate authentication information of the digital asset, and send the revised digital asset and the authentication information to a destination device. Instead of automatically redacting, removing, or otherwise obscuring sensitive information, cloud server 140 may or identify potentially information for the owner and allow the owner to redact, remove, or otherwise obscure some or all of the sensitive information (i.e., allowing the user to approve or reject some or all of the proposed redactions). The request may be from owner 112 of the digital asset (e.g., via owner device 110 or any device connected to network 190), another individual (e.g., via user device 120 or any device connected to network 190), or a third party institution 132 (e.g., via third party computer 130 or any device connected to network 190). The recipient of the digital asset may be owner 112 of the digital asset (e.g., via owner device 110 or any device connected to network 190), another individual (e.g., via user device 120 or any device connected to network 190), or a third party institution 132 (e.g., via third party computer 130 or any device connected to network 190). Any number of cloud servers 140 may be included in system 100, and cloud server 140 may comprise any number of physical, virtual, shared, or distributed devices.

Figure 2:
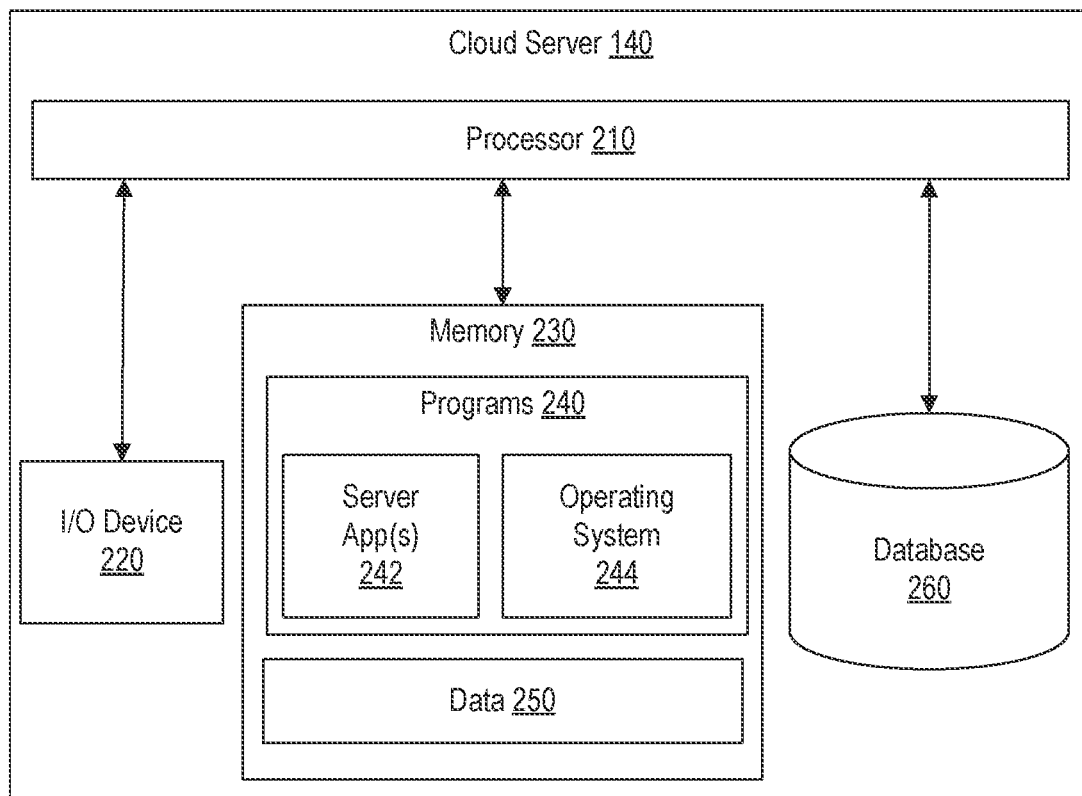
FIG. 2 is a block diagram of a cloud server used in the system of FIG. 1, consistent with disclosed embodiments.

FIG. 2 is a block diagram of cloud server 140, consistent with disclosed embodiments. As shown, cloud server 140 may include one or more of processors 210, input/output (I/O) devices 220, a memory 230 storing programs 240 including, for example, server app(s) 242, operating system 244, and storing data 250, and a database 260. Cloud server 140 may be a single server or may be configured as a distributed computer system including multiple servers or computers that interoperate to perform one or more of the processes and functionalities associated with the disclosed embodiments.

Processor 210 may be one or more known processing devices, such as a microprocessor from the Pentium™ family manufactured by Intel™ or the Turion™ family manufactured by AMD™. Processor 210 may constitute a single core or multiple core processors that executes parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual, quad core, etc.) configured to provide parallel processing functionalities to allow cloud server 140 to execute multiple processes simultaneously. One of ordinary skill in the art would understand that other types of processor arrangements could be implemented that provide for the capabilities disclosed herein.

I/O devices 220 may be one or more devices configured to allow data to be received and/or transmitted by cloud server 140. I/O devices 220 may include one or more user I/O devices and/or components, such as those associated with a keyboard, mouse, touchscreen, display, etc. I/O devices 220 may also include one or more digital and/or analog communication devices that allow cloud server 140 to communicate with other machines and devices, such as other components of system 100. I/O devices 220 may also include interface hardware configured to receive input information and/or display or otherwise provide output information. For example, I/O devices 220 may include a monitor configured to display a user interface.

Cloud server 140 may include one or more storage devices configured to store information used by processor 210 (or other components) to perform certain functions related to the disclosed embodiments. In one example, cloud server 140 may include memory 230 that includes instructions to enable processor 210 to execute one or more applications, such as server applications, an electronic transaction application, network communication processes, and any other type of application or software known to be available on computer systems. Alternatively or additionally, the instructions, application programs, etc., may be stored in an internal database 260 or external storage (e.g., cloud storage 150 in FIG. 1) in direct communication with cloud server 140, such as one or more database or memory accessible over network 190. Database 260 or other external storage may be a volatile or non-volatile, magnetic, semiconductor, tape, optical, removable, non-removable, or other type of storage device or tangible (i.e., non-transitory) computer-readable medium.

In the disclosed embodiments, cloud server 140 may include memory 230 that includes instructions that, when executed by processor 210, perform one or more processes consistent with the functionalities disclosed herein. In some embodiments, cloud server 140 may include memory 230 that may include one or more programs 240 to perform one or more functions of the disclosed embodiments. Moreover, processor 210 may execute one or more programs located remotely from system 100. For example, cloud server 140 may access one or more remote programs, that, when executed, perform functions related to disclosed embodiments.

Programs 240 stored in memory 230 and executed by processor(s) 210 may include one or more server app(s) 242 and operating system 244. Server app(s) 242 may incorporate one or more apps that cause processor(s) 210 to execute one or more processes related to online storage and content sharing, including but not limited to, authenticating a digital asset, detecting sensitive information on the digital asset, removing, redacting, or otherwise obscuring the sensitive information from the digital asset before sharing the digital asset with other devices, etc.

Memory 230 and database 260 may include one or more memory devices that store data and instructions used to perform one or more features of the disclosed embodiments. Memory 230 and database 260 may also include any combination of one or more databases controlled by memory controller devices (e.g., server(s), etc.) or software, such as document management systems, Microsoft® SQL databases, SharePoint® databases, Oracle™ databases, Sybase™ databases, or other relational databases. Memory 230 and database 260 may also store the digital asset uploaded or owned by a user, such as owner 112, user 122, and third party institution 132.

Referring back to FIG. 1, cloud server 140 may also be communicatively connected to one or more remote memory devices, such as cloud storage 150, through network 190 or a different network. Cloud storage 150 may be configured to store information and may be accessed and/or managed by cloud server 140. The uploaded digital assets may be saved in cloud storage 150. By way of example, cloud storage 150 may be document management systems, Microsoft® SQL database, SharePoint® databases, Oracle™ databases, Sybase™ databases, or other relational databases. Systems and methods consistent with disclosed embodiments, however, are not limited to separate databases or even to the use of a database.

Cloud server 140 and/or cloud storage 150 may generate and store a record of when a digital asset is uploaded to the system and/or downloaded. Information stored in the record may include, for example, the person or entity uploading, requesting, or receiving the record; the time of the activity; the version of the document uploaded, requested, or received; the alterations made to the document before it was downloaded or sent to the recipient; a copy of the document downloaded or sent to the recipient, etc. As described in more detail below, cloud server 140 may use this information to determine the provenance of a digital asset. Moreover, the record can be viewed by the owner of the digital asset to track the usage and movement the digital asset.

Figure 3:
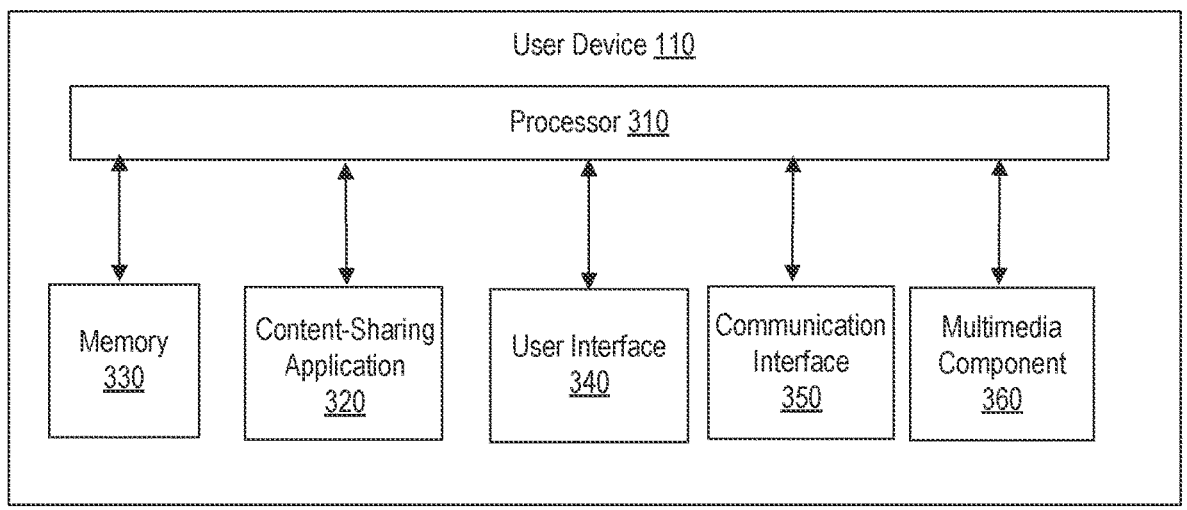
FIG. 3 is a block diagram of an exemplary user device used in the system of FIG. 1, consistent with disclosed embodiments.

As described above, cloud server 140 and cloud storage 150 may exchange data with other components of system 100. For example, owner 112 may use owner device 110 to upload digital assets to cloud server 140 and/or cloud storage 150 for storage. FIG. 3 is a block diagram of owner device 110, consistent with disclosed embodiments. For example, owner device 110 may be a mobile phone, a personal computer, a wearable device (e.g., a smart watch, smart glasses, etc.), a digital broadcast terminal, a messaging device, a gaming console, a tablet computer, a medical device, exercise equipment, a personal digital assistant, and the like. As shown in FIG. 3, owner device 110 may include a processor 310, a content-sharing application 320, a memory 330, a user interface 340, a communication interface 350, and a multimedia component 360.

Processor 310 may be similar to processor 210. In exemplary embodiments, processor 310 may include any appropriate type of general purpose or special-purpose microprocessor, digital signal processor, or microprocessor. Processor 310 may be configured as a separate processor module dedicated to performing the disclosed methods for content sharing. Alternatively, processor 310 may be configured as a shared processor module for performing other functions of owner device 110 unrelated to the disclosed methods for content sharing. In the exemplary embodiments, processor 310 may execute computer instructions (program codes) stored in memory module 330, and may perform functions in accordance with exemplary techniques described in this disclosure.

Memory 330 may include any appropriate type of mass storage provided to store any type of information that processor 310 may need to operate. Memory 330 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 330 may be configured to store one or more computer programs that may be executed by processor 310 to perform the disclosed methods for content sharing.

Content-sharing application 320 may be a module dedicated to performing some or all steps of the disclosed methods for content sharing. Content-sharing application 320 may be configured as hardware, software, or a combination thereof. For example, content-sharing application 320 may be implemented as computer codes stored in memory 330 and executable by processor 310. As another example, content-sharing application 320 may be implemented as a special-purpose processor, such as an application-specific integrated circuit (ASIC), dedicated for performing the disclosed methods for content sharing. As yet another example, content-sharing application 320 may be implemented as an embedded system or firmware.

User interface 340 may include a display panel. The display panel may include a liquid crystal display (LCD), a light-emitting diode (LED), a plasma display, a projection, or any other type of display, and may also include microphones, speakers, and/or audio input/outputs (e.g., headphone jacks).

User interface 340 may also be configured to receive input or commands from owner 112. For example, the display panel may be implemented as a touch screen to receive input signals from the user. The touch screen includes one or more touch sensors to sense touches, swipes, and other gestures on the touch screen. The touch sensors may not only sense a boundary of a touch or swipe action, but also sense a period of time and a pressure associated with the touch or swipe action. Alternatively, or in addition, user interface 340 may include other input devices such as keyboards, buttons, joysticks, and/or tracker balls. User interface 340 may be configured to send the user input to processor 310 and/or content-sharing application 320.

Communication interface 350 can access a wireless network based on one or more communication standards, such as WiFi, LTE, 2G, 3G, 4G, 5G, etc. In one exemplary embodiment, communication interface 350 may include a near field communication (NFC) module to facilitate short-range communications between owner device 110 and other devices. In other embodiments, communication interface 350 may be implemented based on a radio-frequency identification (RFID) technology, an infrared data association (IrDA) technology, an ultra-wideband (UWB) technology, a Bluetooth® technology, or other technologies.

Optional multimedia component 360 may be any device that generates a digital asset that may be stored in cloud server 140. For example, multimedia component 360 may include an audio recorder, a front camera, a rear camera, a biometric reader, etc. For example, multimedia component 360 may be a front camera that can take a photograph, creating a new digital asset, while owner device 110 is in an operation mode. Owner device 110 may then synchronize the captured photo to cloud storage 150 in real time and store it in owner 112's cloud storage account. Similarly, various multimedia components 260 may be used to upload audio recordings, photos, videos, biometric data, or other digital assets.

Referring back to FIG. 1, consistent with the disclosed embodiments, owner 112 may have a cloud storage account registered with cloud server 140 and/or cloud storage 150. Owner 112 may upload, through owner device 110, digital assets to cloud storage 150 for storage. For example, the digital assets may include text documents, image files, photos, videos, audio files, or any other type of digital data capable of being stored in cloud storage 150.

In some embodiments, owner 112 may instruct, through owner device 110, cloud server 140 to share one or more digital assets stored in owner 112's cloud storage account to other users, such as user device 120 and/or third-party computer 130. User device 120 may be associated with a user 122, who may be any individual, such as a friend, coworker, landlord, business associate, or other associate of owner 112. Third-party computer 130 may be associated with a third party institution, such as a government agency, a merchant, a business, a hospital, etc. Similarly, owner 112 may also receive digital assets shared by user 122 and/or third party institution 132 via the cloud storage service.

Through the cloud storage service managed by cloud server 140, owner 112, user 122, and third party institution 132 may share various digital assets among each other. For example, a user may share her photo with a friend, or receive a work report from a coworker. As another example, a tenant may send a pay stub to a landlord as part of an application for renting an apartment. As yet another example, a patient may receive a medical lab report from a clinic. These are just a few of the many examples of digital assets that may be shared, but generally speaking, any digital asset that can be stored in the cloud can be shared.

The structures of user device 120 and third party computer 130 are similar to those of owner device 110 and/or cloud server 140. It is to be understood that the configuration and boundaries of the functional building blocks of system 100 have been defined herein as exemplary configurations only. Alternative configurations may be defined so long as the functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 4:
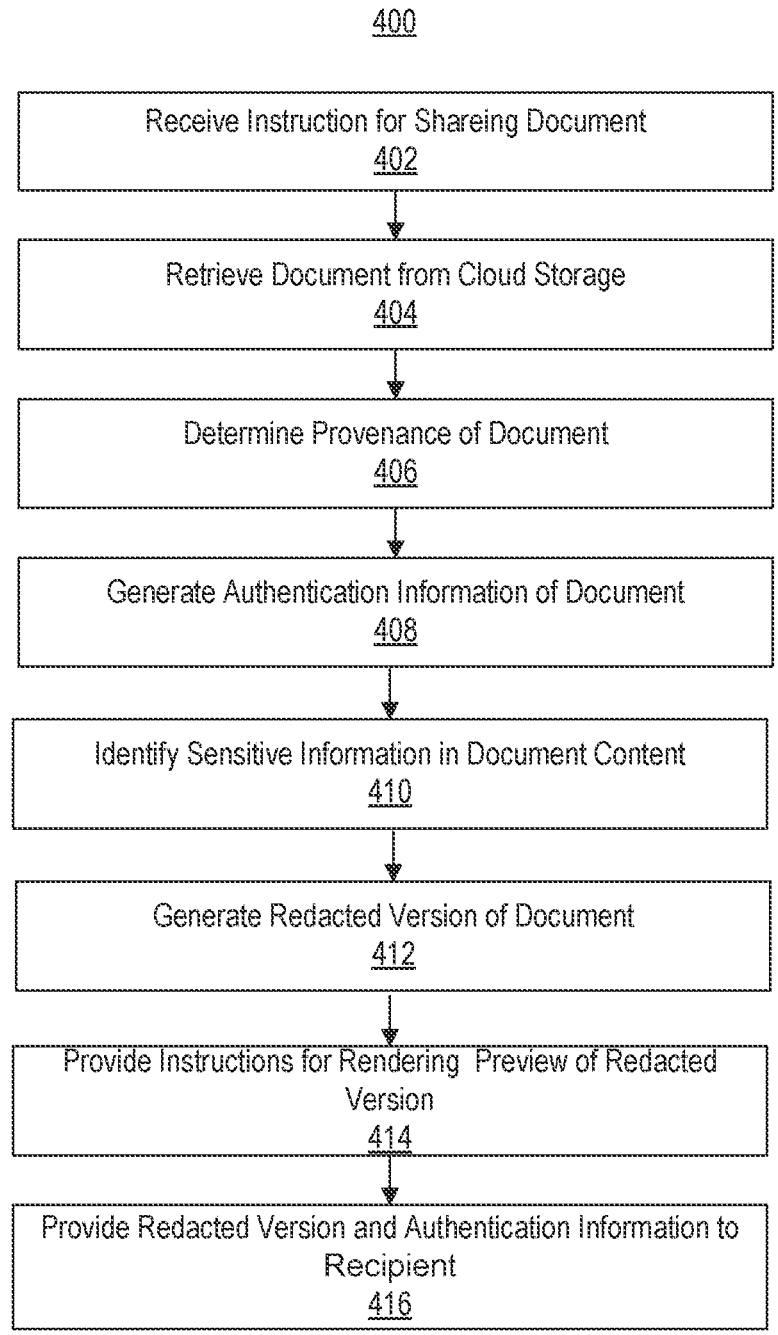
FIG. 4 is a flowchart of an exemplary content-sharing method, consistent with disclosed embodiments.

FIG. 4 is a flowchart of an exemplary content-sharing method 400, consistent with disclosed embodiments. For example, method 400 may be performed by cloud server 140. As described above, owner 112 may have a cloud storage account registered with cloud server 140 and cloud storage 150. The cloud storage account serves as a digital safe deposit box for owner 112 to store her digital assets in a secure, cloud-based storage environment. Besides storing the digital assets, owner 112 may also use the cloud storage account to share the digital assets with other individuals or organizations, such as user 122 and third party institution 132. However, these digital assets often contain sensitive information that owner 112 does not wish to disclose to user 122 or third party institution 132. As such, method 400 may be performed by cloud server 140 to remove, redact, or otherwise obscure the sensitive information from a digital asset to be shared. Referring to FIG. 4, method 400 may include the following steps.

In step 402, cloud server 140 receives, from owner device 110, an instruction to share a designated digital asset with a designated recipient. For example, owner 112 may activate content-sharing application 320 on owner device 110 to access her digital assets stored on cloud storage 150. Content-sharing application 320 may display, in user interface 340, a list of digital assets owned by owner 112 and saved on cloud storage 150. Owner 112 may then select one or more digital assets from the list to share with other people or entities.

The designated recipient may be user 122 or third-party institution 132, who may use user device 120 and third-party computer 130, respectively, to access or receive the shared digital asset(s). The designated recipient may be owner 112; that is, owner 112 may request a copy of a document (e.g., to print and mail, for personal records, to send using a method outside of the cloud storage service system, etc.) Consistent with the disclosed embodiments, owner 112 may voluntarily initiate the asset sharing with user 122 and/or third-party institution 132.

Alternatively, owner 112 may initiate the asset sharing in response to a request from user 122 and/or third-party institution 132. In one embodiment, owner 112 may receive the request via content-sharing application 320. The request may specify which asset(s) is/are requested. For example, owner 112 may receive a request from a friend for sharing photos taken at a recent event or receive a request from a bank for providing additional supporting documents for a loan application. According to the request, owner 112 may use content-sharing application 320 to share the requested digital asset(s) with user 122 and/or third party institution 132.

As a further alternative, instead of using the system to share the document with the recipient, owner 112 may instruct the system to send the digital asset(s) to owner 112 (e.g., to owner device 110). In this way, owner 112 may save, print out, email, or otherwise distribute the digital asset outside of the system.

In step 404, upon receiving the instruction, cloud server 140 retrieves the designated digital asset from cloud storage 150. For example, cloud server 140 may send a query including an identifier of the designated digital asset to cloud storage 150. Cloud storage 150 may then return the designated digital asset and metadata of the designated digital asset to cloud server 140 via network 190.

In optional step 406, cloud server 140 determines provenance of the designated digital asset based on metadata of the designated digital asset. Data provenance, also known as data lineage, refers to data origin or data history of the designated digital asset. The data provenance or lineage includes but is not limited to information regarding the origin or source of the digital asset, processes that have influenced (e.g., altered or manipulated) the digital asset, the chain of custody of the designated digital asset since the asset was created, the movement path of the asset between different databases, etc.

The metadata of the designated digital asset may include various kinds of information describing document history and document property of the designated digital asset. By analyzing the metadata, cloud server 140 may trace and determine the provenance of the designated digital asset.

In some embodiments, cloud server 140 may determine the origin of the designated digital asset, such as the original creator of the digital asset, the party from who owner 112 received the digital asset, etc., based on the digital asset's metadata. For example, the metadata may include the IP address of the device from which the designated digital asset was first uploaded to owner 112's cloud storage account. Based on the IP address, cloud server 140 may determine the identity of the person or entity that creates the designated digital asset.

In some embodiments, cloud server 140 may also trace the past operations performed on the designated digital asset. For example, the metadata may indicate the time when the digital asset was first deposited into owner 112's cloud storage account. The metadata may also describe past modifications to the designated digital asset, when these modifications are performed, and who performed these modifications. The metadata may also indicate who accessed the designated digital asset in the past and when the digital asset was accessed. By examining the metadata, cloud server 140 may determine whether the digital asset has been altered or manipulated since it was created or first owned by owner 112.

In some embodiments, cloud server 140 may also trace the chain of custody of the designated digital asset since the creation of the digital asset. For example, the designated digital asset may be a credit report generated by a credit bureau, such as Experian® and TransUnion®, and provided by the credit bureau to owner 112's bank. The bank subsequently shared the credit report with owner 112. As such, by analyzing the metadata, cloud server 140 may determine that the credit bureau, the bank, and owner 112 all have been in possession of the credit report and further determine the respective possession periods.

In some embodiments, cloud server 140 may authenticate the digital asset based on credential of the asset's creator. For example, if the designated digital asset is a driving record created by a Department of Motor Vehicles, cloud server 140 may determine that the designated digital asset is authentic.

In some embodiments, cloud server 140 may also authenticate the designated digital asset based on historical operations performed on the designated digital asset. For example, if it is determined that the designated digital asset was not modified since it was uploaded into owner 112's cloud storage account, cloud server 140 may determine the digital asset is authentic.

In some embodiments, cloud server 140 may also assign an authentication score to the designated digital asset to measure the degree of authenticity. For example, cloud server 140 may assign a high authentication score to a digital asset received by owner 112 from a friend, coworker, or family member, and assign a low authentication score to documents received from a person to whom owner 112 only has a low affinity. As another example, although a digital asset has a long chain of custody, cloud server 140 may still assign a high authentication score to the digital asset if each custodian in the chain is highly credible.

It is contemplated that the above are only examples of using provenance information to authenticate a digital asset. The present disclosure does not limit the ways for authenticating the designated digital asset based on the provenance of the digital asset.

In optional step 408, cloud server 140 generates authentication information based on the provenance of the designated digital asset. Specifically, cloud server 140 may authenticate the digital asset based on the provenance of the designated digital asset.

In some embodiments, if the designated digital asset is determined to be authentic, cloud server 140 may generate an authentication certificate to certify the authenticity of the digital asset. The authentication certificate may be in the form of a document attached to the designated digital asset and indicating that the authenticity of the designated digital asset is certified by the cloud service provider.

Alternatively, the authentication certificate may be in the form of a digital signature attached to the designated digital asset. For example, cloud server 140 may create an encrypted digital code appended to the designated digital asset. For example, cloud server 140 may create the encrypted digital code by generating a one-way hash of the designated digital asset and then encrypting the hash with a private key. The presence of a digital certification indicates the designated digital asset is created by a credible user and the digital asset has not been altered without authorization.

In some embodiments, cloud server 140 may generate an authentication report indicating the provenance of the designated digital asset. The authentication report may also include an authentication score of the digital asset. For example, if cloud server 140 determines that the creator of the designated digital asset cannot be authenticated or the designated digital asset may have been altered, the authentication report may include a low authentication score and indicate the reasons for such low score.

In step 410, cloud server 140 identifies sensitive information in the designated digital asset. Cloud server 140 may analyze patterns of content data in the designated digital asset and identify the data patterns that match the signature patterns of the sensitive information. Specifically, cloud server 140 may determine the file format of the designated digital asset based on the metadata of the digital asset. File format refers to the standard ways that a digital asset can be created and/or stored, such as PDF (Portable Document Format), Microsoft® Word, CSV (Comma Separated Values)), TAX (TurboTax® file), JPEG (Joint Photographic Experts Group), TIFF (Tagged Image File Format), etc. In some embodiments, the designated digital asset may have a file extension specifying the asset's file format. For example, a "doc" file extension indicates that the designated digital asset is a word processing file, a "dbf" file extension indicates that the designated digital asset is a database file, and an "xml" file extension indicates that the designated digital asset is an extensible markup language file.

Based on the file format, cloud server 140 may select a file-processing application suitable for accessing the data content of the designated digital asset. For example, cloud server 140 may use a text editor to access a text file and use image-processing software to access image data of a photo.

Cloud server 140 may analyze the content data and identify portions of the content data that have patterns matching the signature patterns of the sensitive information. Consistent with the disclosed embodiments, when the content data includes text information, cloud server 140 may identify text fields matching a text pattern such as a social security number, a bank account number, a phone number, a selected word or name, etc. In some embodiments, cloud server 140 may identify the text fields using recognition techniques such as named-entity recognition. Named-entity recognition may be applied to text data to identify and categorize text fields into predefined text categories, e.g., identification numbers, locations, individuals, dates, etc. Once a text field is identified and categorized, cloud server 140 may determine whether the text field corresponds to sensitive information. For example, an identification number such as a social security number, a driver's license number, a phone number, etc., may be defined as sensitive information. As another example, cloud server 140 may consider a text field categorized as an individual as corresponding to sensitive information if the text field matches a name included in a list of predetermined names. In some embodiments, cloud server 140 may also use other pattern-matching techniques to identify certain regular expressions, wildcards, literal character strings, etc.

In the disclosed embodiments, when the content data includes image data, cloud server 140 may extract features of the image data and determine whether the features represent a predetermined person or object. For example, owner 112 may prefer not to share her children's photos with other people, and thus set the images of the children as part of the sensitive information. If the designated digital asset is a photo, cloud server 140 may employ an image-recognition application to detect whether the photo contains data representing a child. If data representing a human face are detected, cloud server 140 may determines the photo contains sensitive information. Alternatively, cloud server 140 may employ a facial-recognition application to extract features representing a human face from the image data of the photo, and then compare the extracted features with pre-stored features that represent owner 112's children. If a match is found, cloud server 140 may conclude that the photo contains owner 112's children.

In the disclosed embodiments, cloud server 140 may also use optical character recognition (OCR) tools to identify sensitive information contained in the designated digital asset. Specifically, cloud server 140 may convert the designated digital asset into to a document image. Cloud server 140 may then perform OCR on the document image by recognizing the characters in the document image as text and generate a bounding rectangle for each of the characters. A bounding rectangle is described by bounding coordinates on vertical and horizontal axes that form a geometric rectangle surrounding a corresponding character or word in the document image. In some embodiments, the bounding rectangle also includes a buffer area that extends the area surrounding the character. The buffer area may be determined using a preconfigured surrounding threshold that defines the additional area (i.e., additional height and width) that should be included in the bounding rectangle. Further, the preconfigured surrounding threshold may be a random value within a range of potential values so that the buffer area is a different height and width for each bounding rectangle. The buffer area may ensure that redaction boxes generated using the bounding rectangle better obfuscate a redacted character or word.

Cloud server 140 may also search for characters and/or words in the OCR results that match the text pattern of certain sensitive information. For example, cloud server 140 may search the OCR results of a document image for a social security number. If characters matching the social security number are found, cloud server 140 may determine the text location of the social security number in the image document as the location of the bounding rectangles of the matching characters.

In the disclosed embodiments, cloud server 140 may also identify the sensitive information in the designated digital asset content based on the content of the designated digital asset. For example, the contents of the digital asset may be identified as tax information, medical information, a credit report, photo, purchase receipt, bank account statement, utility bill, etc. The digital asset may contain metadata specifying its content. For example, the header of the designated digital asset may contain a metadata field indicating the content. Based on the content, cloud server 140 may determine which type of sensitive information is present in the designated digital asset. For example, if the digital asset is a tax document, cloud server 140 determines that the relevant sensitive information may include owner 112's tax ID, social security number, annual gross income, etc. As another example, if the digital asset is a family photo, cloud server 140 determines that the relevant sensitive information may include images of owner 112's children.

Based on the type of sensitive information in the designated digital asset, cloud server 140 may further locate in the digital asset those data fields with a data pattern matching the determined type of sensitive information. For example, if cloud server 140 determines the digital asset is a tax document and may contain owner 112's social security number, cloud server 140 may specifically search in the digital asset's content for data fields whose format match the format of a social security number. This targeted search improves the efficiency of identifying and locating sensitive in the designated digital asset.

In some embodiments, cloud server 140 may also allow owner 112 to select or define the category or type of sensitive information to be redacted from the designated digital asset. For example, cloud server 140 may send instructions to owner device 110 for displaying a user interface. The user interface may list multiple categories of sensitive information selectable by owner 112. These categories may include, but are not limited to, personal identification numbers (e.g., social security number, user account numbers, etc.), phone numbers, physical addresses, doctor's medical notes, child photos, etc. Cloud server 140 may be configured to only remove, redact, or otherwise obscure the user-selected categories of sensitive information from the designated digital asset. This feature allows owner 112 to flexibly define which categories of sensitive information should be removed, redacted, or otherwise obscured in a particular document.

Still referring to FIG. 4, in step 412, cloud server 140 generates a redacted version of the designated digital asset by modifying the content of the designated digital asset to remove, redact, or otherwise obscure the identified sensitive information. Cloud server 140 may generate the redacted version in various manners. In some embodiments, cloud server 140 may generate the redacted version by removing the identified sensitive information from the data constituting the designated digital asset. In some embodiments, cloud server 140 may generate the redacted version by replacing the identified sensitive information with random information that is not related to owner 112. For example, cloud server 140 may replace owner 112's phone number with a randomly generated number that resembles the format of a common phone number. In some embodiments, cloud server 140 may generate the redacted version by generating alteration boxes, e.g., redaction boxes or highlight boxes, to conceal the identified sensitive information. For example, if OCR is used to identify the sensitive information, cloud server 140 may use alteration boxes to cover the bounding rectangles corresponding to the identified sensitive information, and create an updated document image including the alteration boxes, i.e., redactions or highlights. In some embodiments, cloud server 140 may generate the redacted version by obscuring the part of the designated digital asset that includes the identified sensitive information. For example, cloud server 140 may obscure a child face in a photo before the photo is shared.

In optional step 414, cloud server 140 causes owner device 110 to display a preview of the redacted version. For example, cloud server 140 may transmit the redacted version to owner device 110 for display via content-sharing application 320. Owner 112 may look at the preview and provide feedback on the redacted version via content-sharing application 320.

Owner 112 may accept some, all, or none of the proposed revisions to the digital asset. Owner 112 may also add further revisions to the digital asset. Owner 112 may also change the way the digital asset is revised. For example, the system may propose replacing the owner's social security number with a non-sense set of digits that fit the same format (e.g., replacing the user's social security number with "123-45-6789"). Owner 112 may request that the social security number be redacted using an opaque redaction box to cover the number instead.

Figure 5:
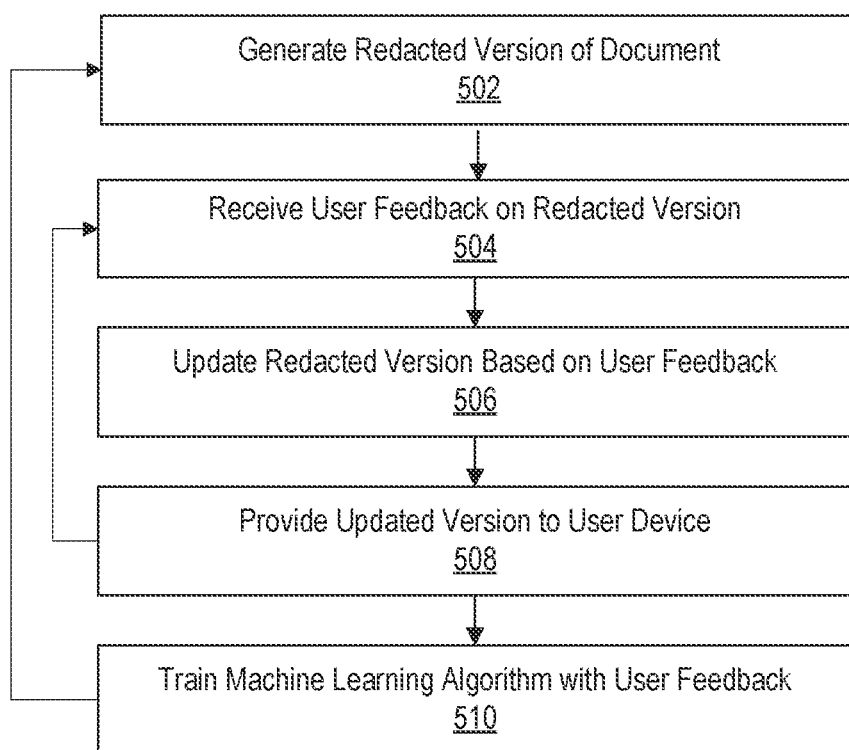
FIG. 5 is a flowchart of an exemplary method for generating a redacted version of a digital asset, consistent with disclosed embodiments.

Consistent with the disclosed embodiments, the user feedback may be used to adjust the redacted version and train a machine learning algorithm to better predict the desired redacting level and data fields that need to be removed, redacted, or otherwise obscured. FIG. 5 is a flowchart of an exemplary method 500 for generating a redacted version of a digital asset, consistent with disclosed embodiments. Referring to FIG. 5, method 500 may be performed by cloud server 140 to generate a redacted version of the designated version based on user feedback.

In step 502, cloud server 140 generates a redacted version of the designated digital asset. Cloud server 140 then causes owner device 110 to display a preview of the redacted version and solicit owner 112's feedback. If the redacted version is proper, owner 112 may confirm via content-sharing application 320 that the redacted version is approved for sharing. However, if the redacted version needs to be modified, owner 112 may enter annotations in the asset or provide instructions to content-sharing application 320 to indicate how the modifications should be done.

In step 504, cloud server 140 receives the user feedback from owner device 110. If the feedback indicates modification to the redacted version is needed, cloud server 140 proceeds to step 506 to update the redacted version based on the user feedback. For example, cloud server 140 may remove, redact, or otherwise obscure, in the designated digital asset, additional data fields that are indicated by owner 112 as containing sensitive information. As another example, if owner 112 indicates certain redacted, removed, or obscured information is not sensitive (i.e., the redaction, removal, or obscuring of the information is not necessary), cloud server 140 may undo the redaction, removal, or obscuring.

In step 508, cloud server 140 provides the updated version to owner device 110 for display and seeks owner 112's confirmation. Steps 504-508 can be performed repeatedly until owner 112 confirms that the redacted version is approved for sharing. This way, method 500 allows a user to preview a digital asset prior to sharing it with other people and to make desired adjustments to the digital asset.

In step 510, cloud server 140 uses the user feedback to train a machine learning algorithm for identifying sensitive information. The machine learning algorithm may employ a neural network architecture, such as a convolutional neural network (CNN), a deep neural network (DNN), etc. The data fields indicated by owner 112 as containing sensitive information are fed into the neural network to learn the data pattern associated with the sensitive information and the locations of the sensitive information in a digital asset. The trained neural network may then be used in step 502 to determine the proper redaction level for a digital asset and locate the data fields that need to be redacted, removed, or obscured.

Referring back to FIG. 4, in step 416, cloud server 140 provides the redacted version and authentication information of the designated digital asset to a recipient. By providing both the redacted version and authentication information, method 400 provides assurance about the authenticity of the shared digital asset to the recipient, despite part of the information on the shared digital asset is concealed from the recipient.

Cloud server 140 may perform step 416 in various manners. In some embodiments, cloud server 140 may send the redacted version and authentication information directly to the recipient's device, e.g., user device 120, third-party computer 130, or owner device 112. In some embodiments, cloud server 140 may send a prompt to the recipient's device, inviting the recipient to access or retrieve the redacted version (and authentication information, if provided) via the recipient's cloud storage account. In some embodiments, cloud server 140 may send a notification message, e.g., an email or text message, to the recipient, inviting the recipient to download the redacted version (and authentication information, if provided) from a secured site. The notification message may include the uniform resource locator (URL) of the site and a downloading password.

Figure 6:
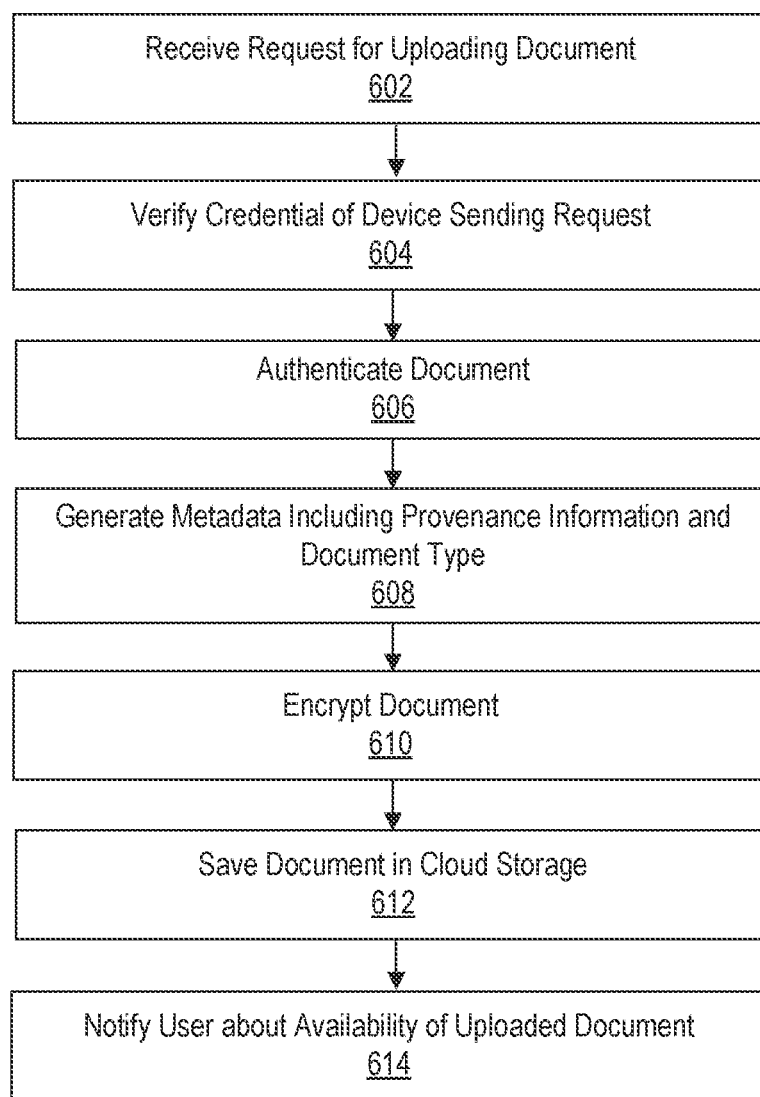
FIG. 6 is a flowchart of an exemplary method for receiving a shared digital asset, consistent with disclosed embodiments.

The disclosed cloud-based content-sharing system can be used by a user to not only share digital assets controlled or owned by the user with other people, but also receive digital content shared by other people to the user. For example, the designated digital asset in method 400 may be originally received by owner 112 from another person or entity, such as user 122 or third party institution 132. For example, user 122 may be a coworker who wants to send a business proposal to owner 112. As another example, third party institution 132 may be a merchant who wants to send a purchase receipt to owner 112, or a clinic which needs to send a lab report to owner 112. FIG. 6 is a flowchart of a method 600 for receiving a shared digital asset, consistent with disclosed embodiments. Referring to FIG. 6, method 600 may be performed by cloud server 140 and include the following steps.

In step 602, cloud server 140 receives a request for uploading a digital asset to owner 112's cloud storage account. The request is sent from a device other than owner device 110, such as user device 120 or third party computer 130.

In optional step 604, cloud server 140 verifies credential of the device sending the request. Cloud server 140 may verify the credential in various ways. For example, cloud server 140 may determine whether the request is sent through a verified cloud-storage account. Cloud server 140 may also determine whether the request is sent from a trusted IP address or whether the MAC address of the device sending the request has been registered with cloud server 140 already.

In optional step 606, cloud server 140 authenticates the uploaded digital asset based on the credential of the device sending the request. If the credential can be verified, cloud server 140 may determine the digital asset is authentic. For example, if the digital asset is a mortgage statement uploaded by a bank, cloud server 140 may conclude the mortgage statement to be authentic.

In optional step 608, cloud server 140 generates metadata of the uploaded digital asset. The metadata may include provenance information and/or content type of the uploaded digital asset. The provenance information may indicate the identity or name of the person or entity that uploads the digital asset, the IP or MAC address of the device from which the digital asset is uploaded, the date and time when the digital asset is uploaded, etc. The content type may specify the type of content in the uploaded digital asset, such as tax document, medical report, credit report, photo, purchase receipt, back account statement, utility bill, etc. The information about the content type may be entered by the person or entity that uploads the digital asset. Cloud server 140 may write the generated metadata into the file head of the uploaded digital asset.

In optional step 610, cloud server 140 may encrypt the uploaded digital asset. Specifically, cloud server 140 may apply an algorithm to replace the data of the uploaded digital asset with ciphertext created based on the data. One or more keys may be used to describe a transformation to be applied to the data. The key(s) may then be kept secret such that it may be difficult or impossible to undo the transformation without access to the key(s). Ciphertext may be created based on a wide variety of standards and algorithms. Examples may include symmetric key algorithms, such as the Data Encryption Standard (DES) or Advanced Encryption Standard (AES), or asymmetric key algorithms.

In step 612, cloud server 140 saves the digital asset (e.g., the encrypted digital asset) in cloud storage 150. If the digital asset has been encrypted, a decryption process may be used when it is later accessed or retrieved to convert the ciphertext back to its original data based on the key(s) used to create the ciphertext or other key(s) specifically for decrypting the data.

In step 614, cloud server 140 notifies owner 112 that the uploaded digital asset is available for access. For example, cloud server 140 may send a prompt to owner device 110, indicating user 122 or third party institution 132 has shared a digital asset with owner 112 and inviting owner 112 to view the uploaded digital asset. As another example, cloud server 140 may notify owner 112 that the uploaded digital asset is available by sending the digital asset to owner 112 (e.g., sending an e-mail with the digital asset attached to owner 112).

Figure 7:
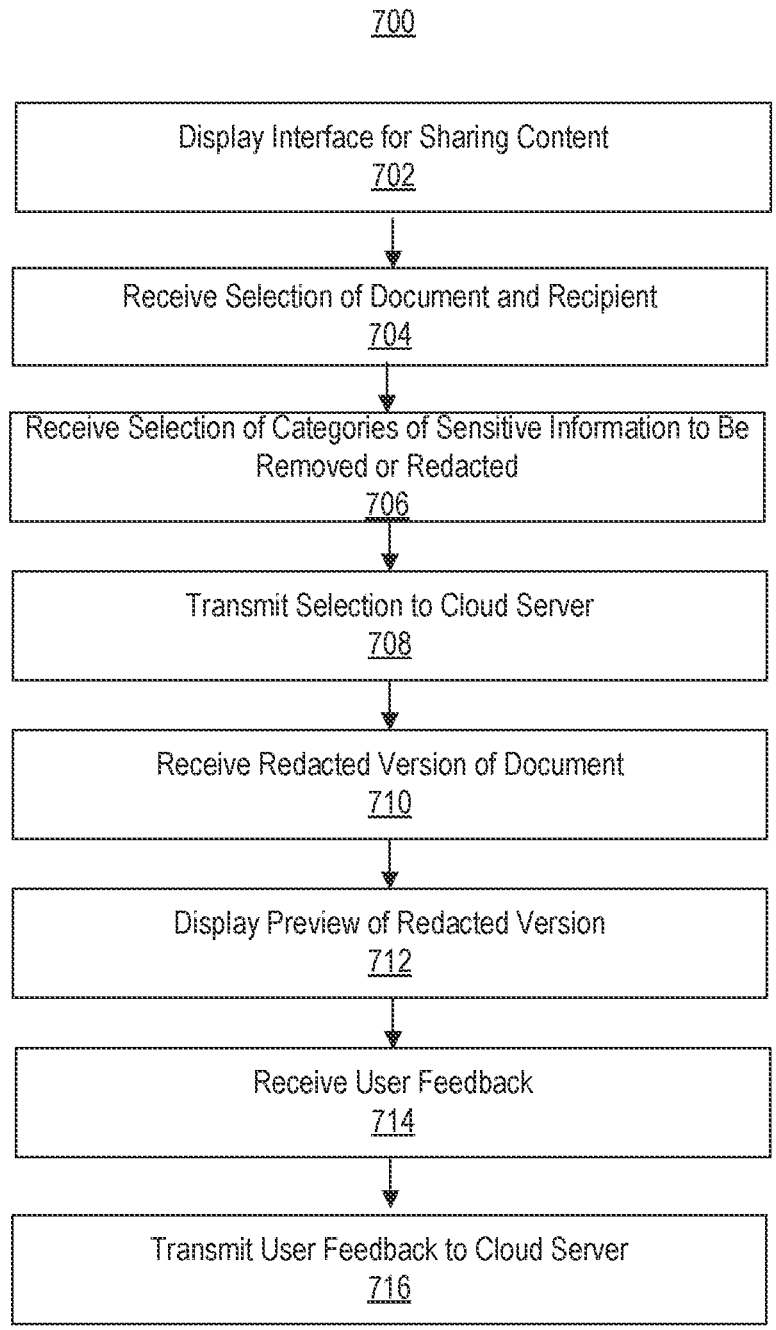
FIG. 7 is a flowchart of an exemplary content-sharing method, consistent with disclosed embodiments.

As described above, methods 400-600 may be performed by cloud server 140. Correspondingly, the present disclosure also provides methods performed by user devices, such as owner device 110. FIG. 7 is a flowchart of an exemplary content-sharing method 700, consistent with disclosed embodiments. For example, method 700 may be performed by owner device 110, or, more specifically, content-sharing application 320 on owner device 110. Referring to FIG. 7, method 700 may include the following steps.

In step 702, owner device 110 displays an interface for sharing content. For example, the interface may be presented through content-sharing application 320.

In step 704, owner device 110 receives a selection of a digital asset to be shared and one or more recipients of the digital asset. For example, content-sharing application 320 may display a list of digital assets or file folders currently stored in owner 112's cloud storage account, such that owner 112 may select one of the stored digital assets for sharing. Similarly, content-sharing application 320 may display a list of users who are friends of owner 112, such that owner 112 may select one or more of the users with which to share the digital asset. Alternatively, content-sharing application 320 may provide a search function to search for users or third parties who have accounts with cloud server 140 and select the recipient of the digital asset from the search results. As a further alternative, content-sharing application 320 may allow a user to share a digital asset with a recipient who does not have an account with cloud server 140. In such a case, for example, owner 112 may enter the desired recipient's email address, phone number, or other contact information in content-sharing application 320. Cloud server 140 may then use that contact information to, for example, send the recipient an invitation to create a cloud storage account to access the shared digital asset. Alternatively, system 140 may use the contact information to send the recipient a URL for a site where the recipient may download the shared digital asset (e.g., download the asset as a "guest" or without creating an account). Or cloud server 140 may use the contact information to directly send the digital asset to the recipient (e.g., as an attachment to an e-mail).

Optionally, in step 706, owner device 110 may receive a user selection of one or more categories of sensitive information to be removed, redacted, or otherwise obscured from the designated digital asset. Generally, sensitive information used in the present disclosure may refer to any information an owner may want to redact, such as personally identifying information including, but not limited to, medical records, address, photos, social security numbers, financial account numbers, phone numbers, etc. Owner device 110 may also allow owner 112 to define which type(s) of sensitive information should be removed, redacted, or otherwise obscured. For example, user device 112 may display a list of categories of sensitive information for owner 112 to select, such that information in the selected categories will be removed, redacted, or otherwise obscured, while information in the unselected categories will not be altered.

In step 708, owner device 110 transmits information about the designated digital asset, identity of the recipient, and user-selected categories of sensitive information to cloud server 140.

In step 710, owner device 110 receives a redacted version of the designated digital asset from cloud server 140.

In step 712, owner device 110 displays a preview of the redacted version prior to sharing of the designated digital asset. The preview shows how the redacted version will appear when it is viewed by the recipient.

In step 714, owner device 110 receives user feedback on the redacted version. In some embodiments, user interface 340 may include a touch screen which displays the preview of the redacted version and allows owner 112 to make annotations directly on the preview. For example, owner 112 may circle around or tab on the data fields that need to be revised. In some embodiments, content-sharing application 320 may provide various redaction tools for owner 112 to manually redact additional data fields on the redacted version or undo certain redactions, removals, or obscuring. In some embodiments, content sharing application 320 may provide options for the type of removal, redaction, or obscuring used (e.g., allowing an owner to use an opaque redaction box instead of substituting non-sense text, etc.).

In step 716, owner device 110 transmits the user feedback to cloud server 140, such that cloud server 140 can adjust the redacted version accordingly. In some embodiments, cloud server 140 may send the adjusted version to owner device 110 for user confirmation. In other embodiments, cloud server 140 may directly provide the adjusted version to the recipient, without requesting confirmation from owner 112.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments. For example, while a financial service provider and merchant have been referred to herein for ease of discussion, it is to be understood that consistent with disclosed embodiments other entities may provide such services in conjunction with or separate from a financial service provider and merchant.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects may also be stored on and executed from many types of tangible computer-readable media, such as secondary storage devices, like hard disks, floppy disks, or CD-ROM, or other forms of RAM or ROM. Accordingly, the disclosed embodiments are not limited to the above-described examples, but instead is defined by the appended claims in light of their full scope of equivalents.

What is claimed is:

1. A system for sharing data, comprising:
a memory storing instructions; and
one or more processors in communication with a storage device and configured to execute instructions to perform operations comprising:
receiving, from a client device, an instruction for sharing a designated digital asset stored in the storage device, wherein the designated digital asset comprising content, and wherein the instruction for sharing the designated digital asset indicates a designated recipient and an owner of the designated digital asset; and
in response to the instruction for sharing the designated digital asset, and without further user input:
determining an origin of the designated digital asset based on metadata of the designated digital asset;
analyzing content of the designated digital asset to identify sensitive information by extracting a feature from the content, wherein the sensitive information is based on the origin;
generating, based on analyzing the content, a redacted version of the designated digital asset to obscure the feature in the content; and
providing, to the designated recipient of the designated digital asset, the redacted version of the designated digital asset.

2. The system of claim 1, further comprising:
generating authentication information indicating an origin of the designated digital asset in response to the instruction for sharing the designated digital asset, and without further user input; and
identifying the sensitive information based on whether the designated recipient is the owner.

3. The system of claim 2, wherein the operations further comprise:
determining a provenance of the designated digital asset; and
determining the authentication information based on the provenance.

4. The system of claim 2, wherein the operations further comprise:
determining a digital signature for the designated digital asset; and
determining the authentication information based on the digital signature.

5. The system of claim 1, wherein the origin is determined based on metadata of the designated digital asset, the origin of the designated digital asset including at least one of a source of the designated digital asset, a historical operation performed on the designated digital asset, or a chain of custody of the designated digital asset.

6. The system of claim 1, wherein analyzing content of the designated digital asset to identify the sensitive information further comprises:
identifying signature patterns of the sensitive information; and
identifying portions of the content that have patterns matching the signature patterns.

7. The system of claim 1, wherein the operations further comprise providing for display, to the client device, a preview of the redacted version.

8. The system of claim 7, wherein the operations further comprise:
receiving, from the client device, user feedback associated with the preview of the redacted version; and
updating the redacted version of the designated digital asset based on the user feedback.

9. The system of claim 8, wherein the user feedback includes digital annotations on the preview of the redacted version.

10. A computer-implemented method, the method comprising:
receiving, from a client device, an instruction for uploading a designated digital asset, wherein the designated digital asset comprises content, and wherein the instruction for sharing the designated digital asset indicates a designated recipient and an owner of the designated digital asset;
generating authentication information indicating an origin of the designated digital asset in response to the instruction for sharing the designated digital asset; and
in response to the instruction for sharing the designated digital asset, and without further user input:
determining a feature extracted from the content that represents sensitive information by identifying the sensitive information based on whether the designated recipient is the owner;
generating a redacted version of the designated digital asset to obscure the feature in the content; and
storing, in a storage device, the redacted version of the designated digital asset.

11. The computer-implemented method of claim 10, further comprising:
determining a provenance of the designated digital asset; and
determining the authentication information based on the provenance.

12. The computer-implemented method of claim 10, further comprising:
determining a digital signature for the designated digital asset; and
determining the authentication information based on the digital signature.

13. The computer-implemented method of claim 10, wherein determining the origin comprises determining a provenance of the designated digital asset based on metadata of the designated digital asset.

14. The computer-implemented method of claim 13, wherein the provenance of the designated digital asset includes a source of the designated digital asset, a historical operation performed on the designated digital asset, or a chain of custody of the designated digital asset.

15. The computer-implemented method of claim 10, wherein the authentication information comprises at least one of an authentication certificate, a digital signature, or an authentication report.

16. The computer-implemented method of claim 10, further comprising providing for display, to the client device, a preview of the redacted version.

17. The computer-implemented method of claim 16, further comprising:
receiving, from the client device, feedback associated with the preview of the redacted version; and
updating the redacted version of the designated digital asset based on the feedback.

18. The computer-implemented method of claim 17, wherein the feedback includes digital annotations on the preview of the redacted version.

19. A system for sharing data, comprising:
a memory storing instructions; and
one or more processors in communication with a storage device and configured to execute the instructions to perform operations comprising:
receiving an instruction for sharing a designated digital asset, wherein the designated digital asset comprises content; and
in response to the instruction for sharing the designated digital asset, and without further user input:
determining origin information of the designated digital asset;
generating authentication information indicating the origin information of the designated digital asset;
determining a feature extracted from the content;
generating a redacted version of the designated digital asset to obscure a representation of a person in the content based on whether a designated recipient is an owner;
identifying sensitive information based on whether the designated recipient is the owner; and
providing, to the designated recipient of the designated digital asset the redacted version of the designated digital asset.

* * * * *